United States Patent [19]

Peter et al.

[11] Patent Number: 4,811,979
[45] Date of Patent: Mar. 14, 1989

[54] BUMPER FOR VEHICLES

[75] Inventors: Dietmar Peter, Hemmingen; Gebhard Poppele, Wangen i. Allgäu, both of Fed. Rep. of Germany

[73] Assignee: Dr. Ing. h.c.F. Porsche Aktiengesellschaft, Stuttgart, Fed. Rep. of Germany

[21] Appl. No.: 70,241

[22] Filed: Jul. 6, 1987

[30] Foreign Application Priority Data

Jul. 4, 1986 [DE] Fed. Rep. of Germany ....... 3622483

[51] Int. Cl.$^4$ .................... B60R 19/02; B60R 19/04
[52] U.S. Cl. .................................. 293/102; 293/120; 293/126; 296/197
[58] Field of Search ............... 293/102, 120, 121, 126, 293/154, 155; 403/71, 405.1; 296/1 C, 197

[56] References Cited

U.S. PATENT DOCUMENTS 2,280,558 4/1942 Thompson ............... 293/155 X
2,991,110 7/1961 Milner ................... 293/126

FOREIGN PATENT DOCUMENTS 0150636 8/1985 European Pat. Off. .
2650081 5/1978 Fed. Rep. of Germany ...... 293/120
2838572 3/1980 Fed. Rep. of Germany .
2927036 1/1981 Fed. Rep. of Germany ...... 293/120
2380167 2/1978 France .
2565538 12/1985 France .
0981937 1/1965 United Kingdom ............ 293/126

Primary Examiner—Andres Kashnikow
Assistant Examiner—Timothy Newholm
Attorney, Agent, or Firm—Barnes & Thornburg

[57] ABSTRACT

A bumper arrangement for vehicles is disclosed, particularly for passenger vehicles and the like. The bumper arrangement includes a dimensionally stable support and an elastic covering forming the end area of the vehicle body. The covering extends at a distance from the support and is fastened locally at the body, a recess being provided at the covering for receiving a license plate. So that the tool costs for the covering are reduced while taking into account specific requirements of different countries and to also ensure that the covering exhibits a good performance, can be mounted easily and is also repair-friendly, the elastic covering comprises several parts that are joined together in transverse direction of the vehicle.

19 Claims, 10 Drawing Sheets

BUMPER FOR VEHICLES

BACKGROUND AND SUMMARY OF THE INVENTION

The invention relates to a bumper for vehicles, particularly passenger vehicles, having a dimensionally stable support and an elastic covering that forms the end area of the body, extends at a distance to the support and is fastened locally at the body, a recess for receiving a license plate being provided preferably in a cetnral area of the covering.

In the case of a known bumper of the initially mentioned type described in German published unexamined application (DE-OS) No. 28 38 572, a covering with a relatively large surface that forms the end area of the body is formed in one piece and is connected with the body by means of screwable fastening elements.

Since in different countries differing legal requirements exist concerning the size of the license plate, the distance of the license from the road, and the lighting of the license plate, several different coverings having correspondingly developed recesses for receiving the license plate are needed for meeting all these requirements. For the manufacturing of these different coverings, costly tools are required that cause high expenses. In addition, even in the case of a local irreparable damaging of the covering, this covering must be replaced completely, which is expensive.

It is an objective of the invention to so design a covering for a bumper that the tool expenses for the covering are reduced while taking into account specific requirements of different countries. In this case, it should also be ensured that the covering functions well, can be mounted easily, and is repair-friendly.

According to the invention, this objective is achieved by providing a multi-partite covering, the parts of which are joined together. In especially preferred embodiments, the covering includes an exchangeable central part for receiving a license plate and at least one covering part on each lateral side of the central part. In certain preferred embodiments, the covering parts include interengageable webs for accommodating their connection to one another along with screw-threaded connectors.

Primary advantages of the invention relate to the fact that by means of the multi-part development of the covering, the tool costs are reduced considerably because much smaller and more compact tools are required. In addition, by means of the smaller component parts of the covering, the mounting is facilitated and in the case of a repair, costs are lowered because in each case only the damaged component parts must be replaced.

By means of the exchangeable central part of the covering, it is achieved that the legal requirements of the different countries can be taken into account in a simple manner, and for all countries, the same lateral parts of the covering can be used. Also, at least component parts of the covering can be used simultaneously for several different types of vehicles. The possibility exists that the covering has the same central part for different types of vehicles, but differently developed side parts, or vice versa according to certain contemplated embodiments of the invention.

By means of the fastening of the central part of the support according to certain embodiments, it is achieved that, in the case of an impact in the center, only the central part of the covering carries out a relative motion in longitudinal direction of the vehicle. The side parts, on the other hand, remain in their mounted position. As a result, damage to the arched end sections of light units located above is avoided. In the case of a diagonal impact onto a side part of the covering, the whole covering - caused by the form-fitting connection between the side part and the central part - carries out a relative movement in longitudinal direction of the vehicle. The guiding devices that are provided between the side parts and the central part cause a defined movement of the central part and this central part returns into its initial position after it has been acted upon.

Other objects, advantages and novel features of the present invention will become apparent from the following detailed description of the invention when considered in conjunction with the accompanying drawings.

DETAILED DESCRIPTION OF THE DRAWINGS

Figure 1:
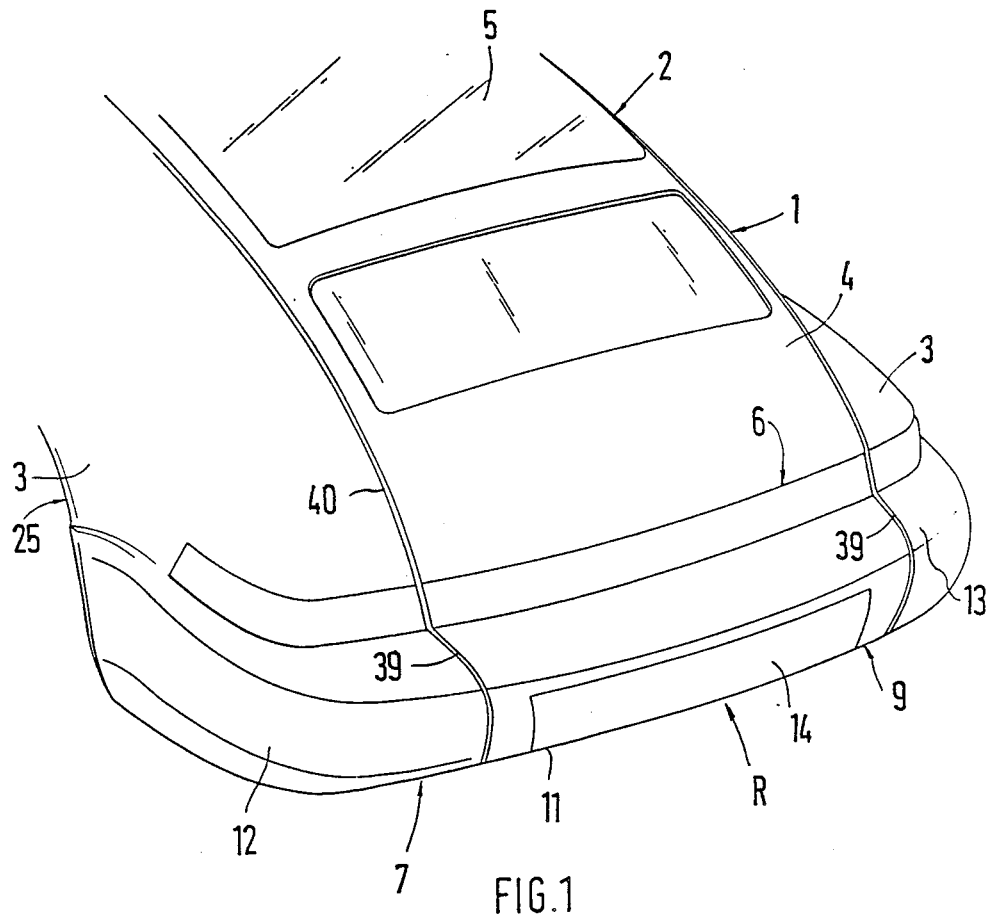
FIG. 1 is a schematic perspective rear diagonal view of a passenger vehicle having a bumper constructed in accordance with a preferred embodiment of the invention.
Figure 2:
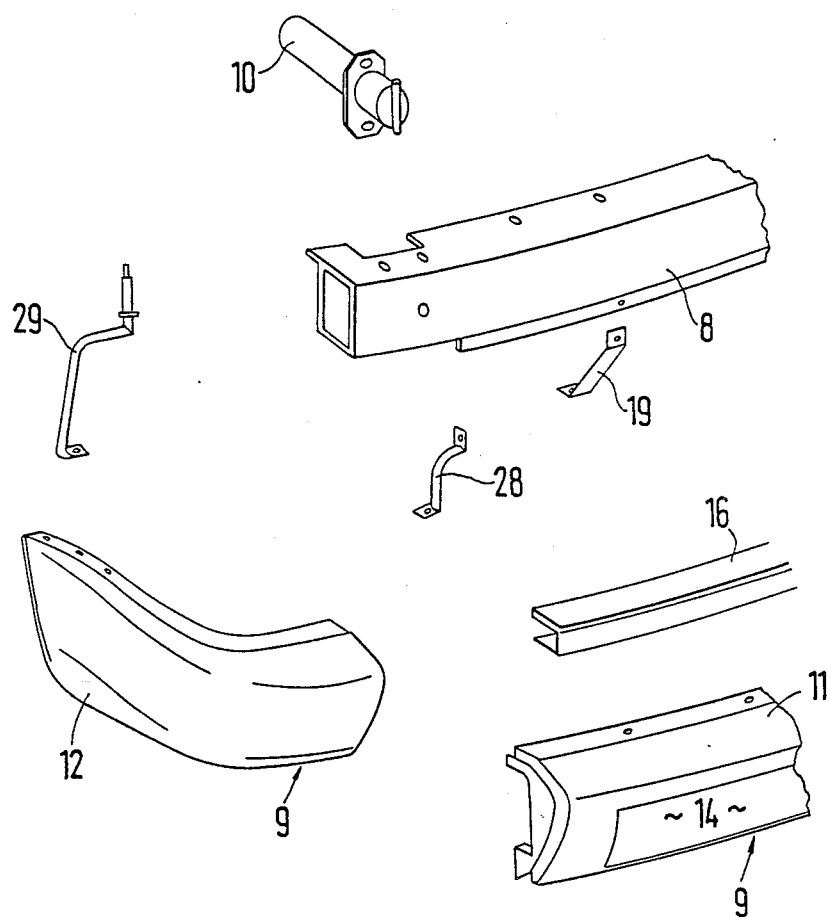
FIG. 2 is a diagrammatic exploded view representation of the component parts of the bumper of FIG. 1.
Figure 3:
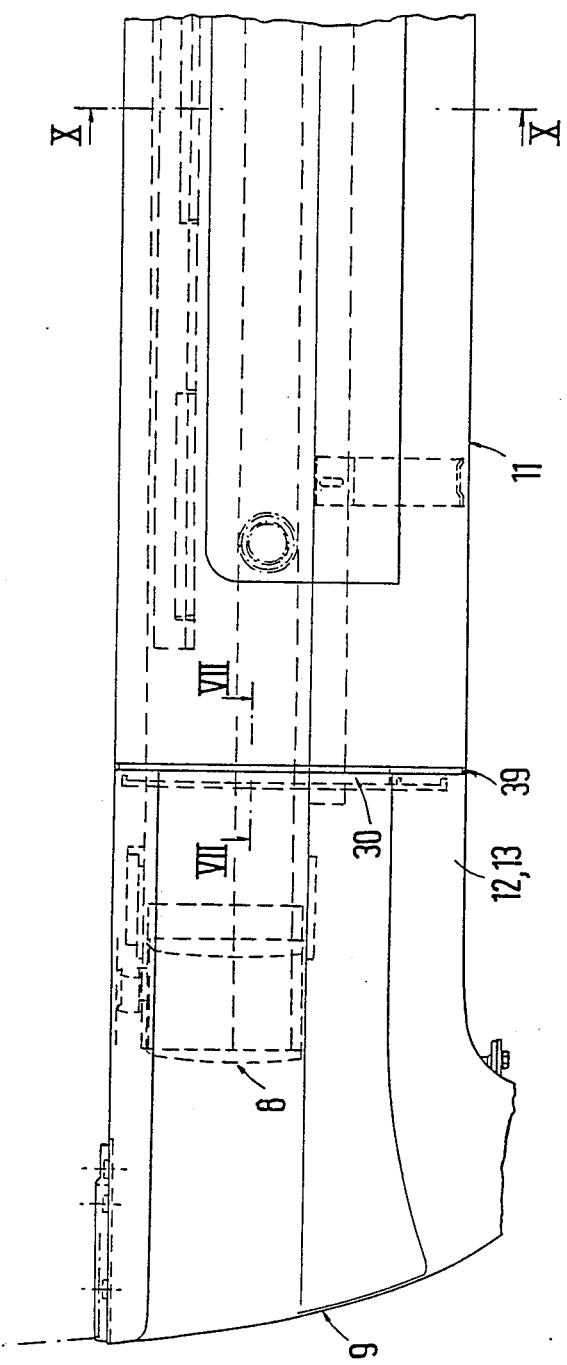
FIG. 3 is a partial view of the bumper taken in the direction of the Arrow R of FIG. 1.
Figure 4:
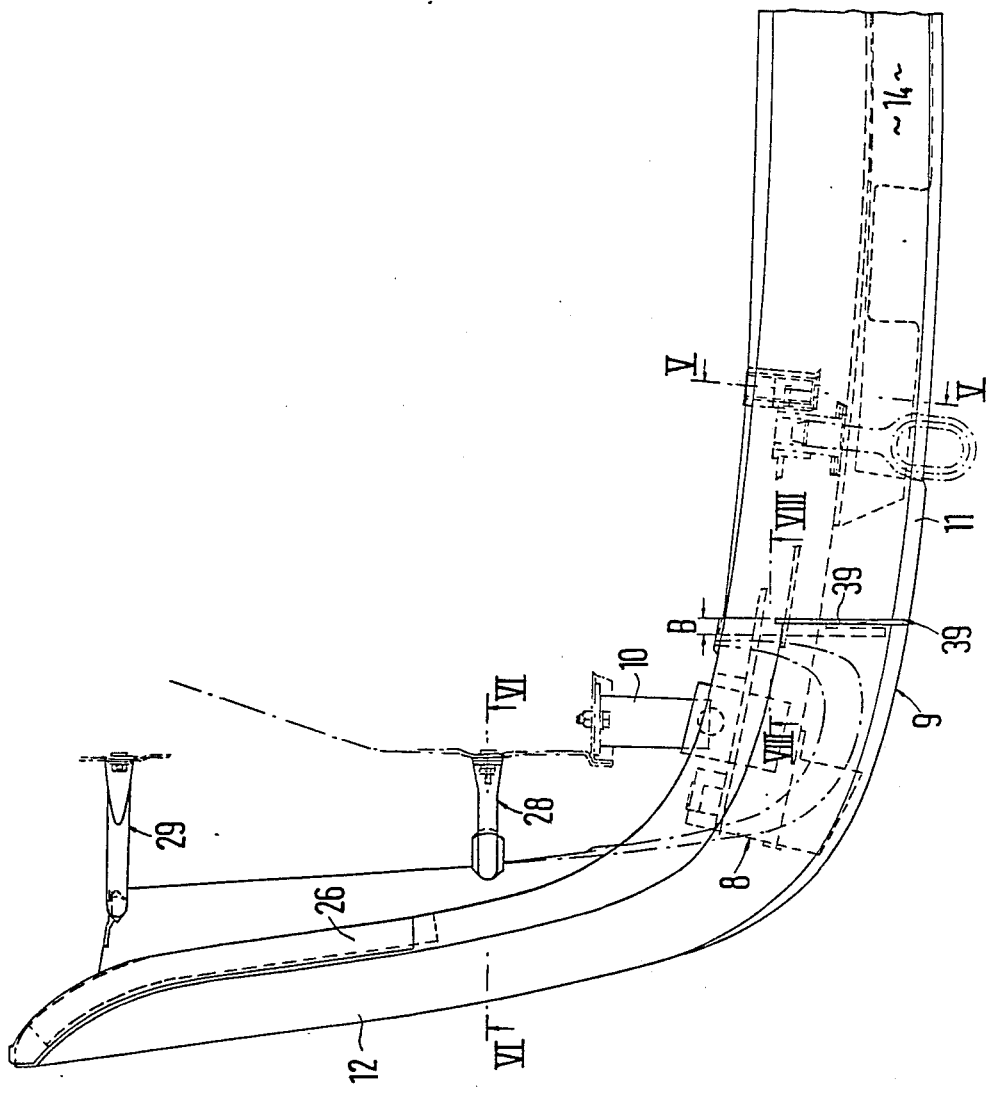
FIG. 4 is a top partial view of the bumper depicted in FIG. 3.

In the illustrated area, the passenger vehicle 1 has a body 2 with side parts 3, a tail gate or door 4, a viewing window 5, as well as a light unit 6. The light unit 6 extends over a substantial part of the width of the passenger vehicle and has arched end sections that are adapted to the shape of the side parts 3.

Below the light unit 6, the body 2 is equipped with a bumper 7 that comprises of a dimensionally stable support 8 and an elastic covering 9 forming the end area of the body 2. The support 8, that consists of metal, plastic or the like, supports itself at hydraulic shock absorbers 10 that are fastened at the body 2. Other damping elements are also contemplated, such as coil springs or the like. In its cross-section, the support 8 may be box-shaped or U-section-shaped. The covering 9 that consists of plastic and preferably of a foamed material such as polyurethane (PU foam) extends at a distance from the support 8 and covers the latter.

Figure 10:
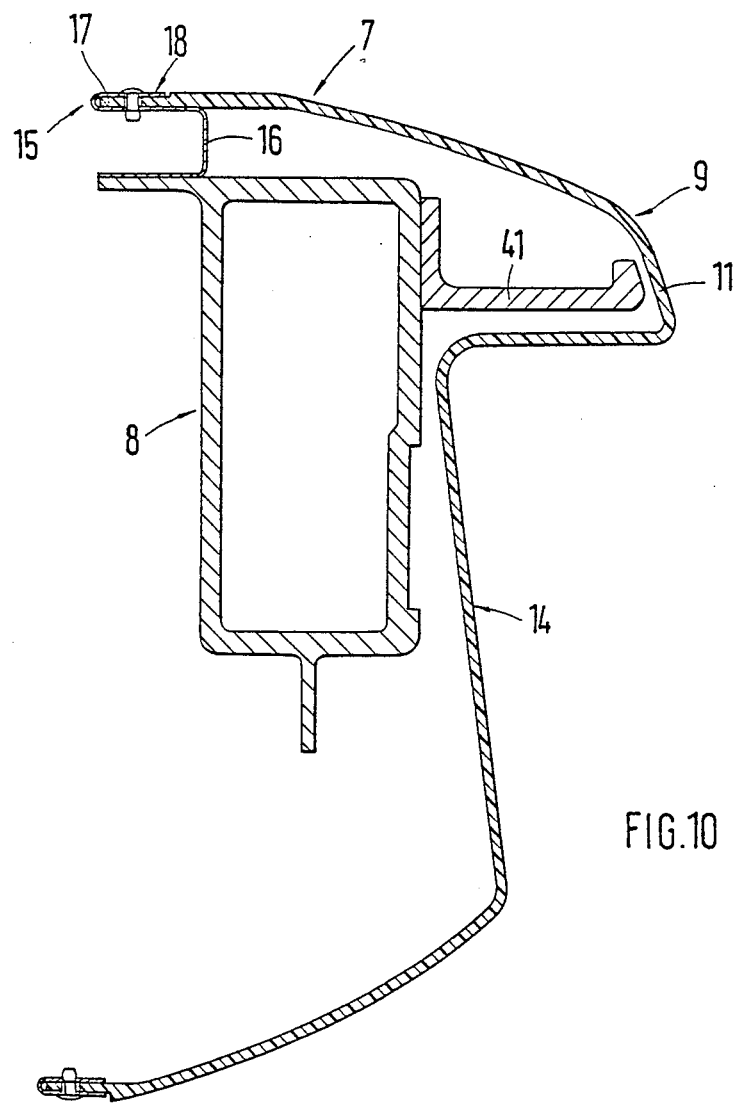
FIG. 10 is a sectional view taken along the Line X—X of FIG. 3.
Figure 10:
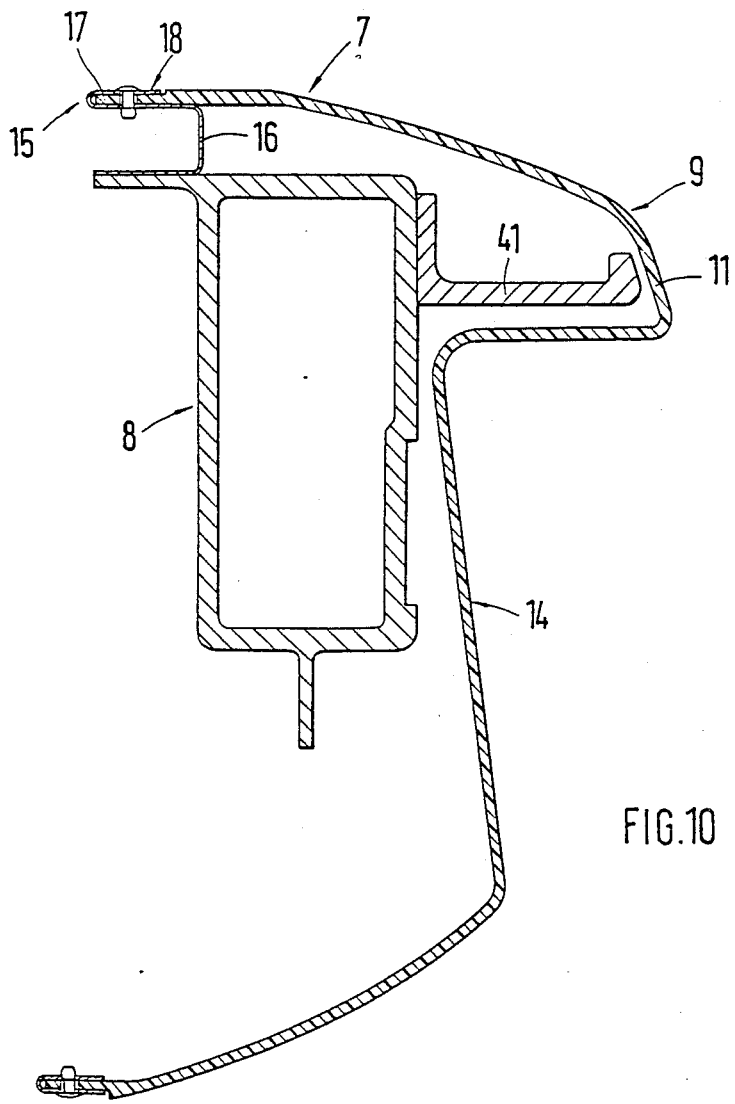

The covering 9 comprises a central part 11 and side parts 12, 13 that are connected to it. The central part 11 has a recess 14 in a cetnral area of its transverse course, for the receiving of a license plate that is not shown in detail, the central part being held in position only at the dimensionally stable support 8. The fastening of the central part 11 takes place by means of holding elements 15. The holding element that is arranged above the dimensionally stable support 8 is formed by a rail 16 extending in transverse direction of the vehicle and supporting itself at the dimensionally stable support 8 and receiving a free end 17 of the covering 9. The free end 17 projects into a U-shaped section 18 of the rail 16 and there is connected with the rail by means of gluing, screwing, riveting or the like (FIG. 10). The rail 16 has approximately the width of the dimensionally stable support 8 and in its cross-section is profiled to be approximately U-shaped, the open side facing the body 2.

Figure 5:
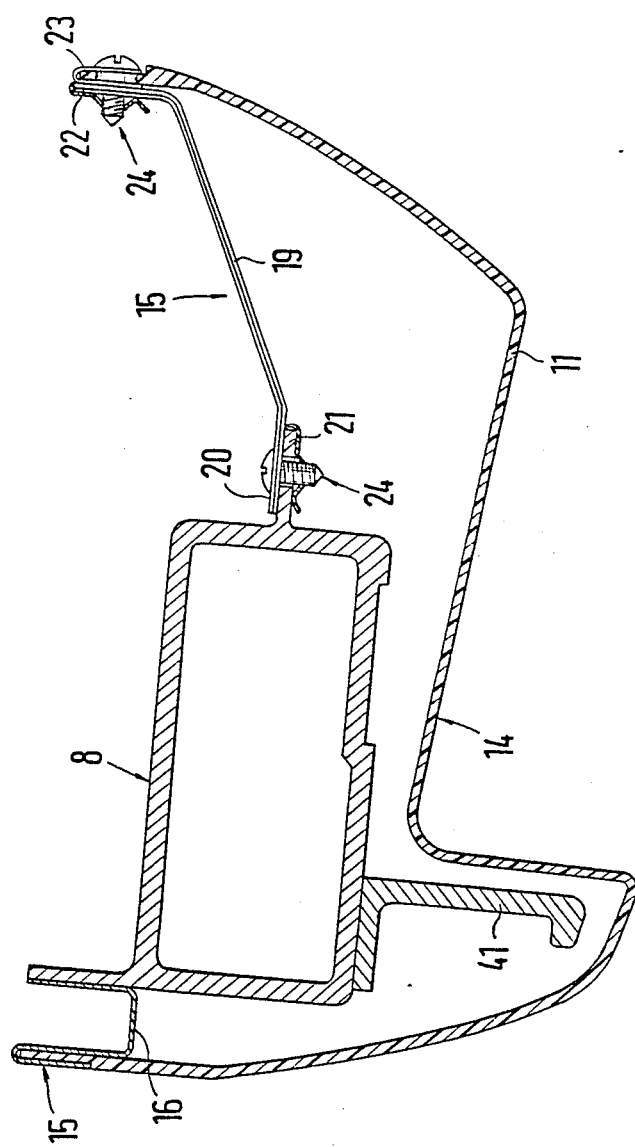
FIG. 5 is a sectional view taken along the Line V—V of FIG. 4.
Figure 6:
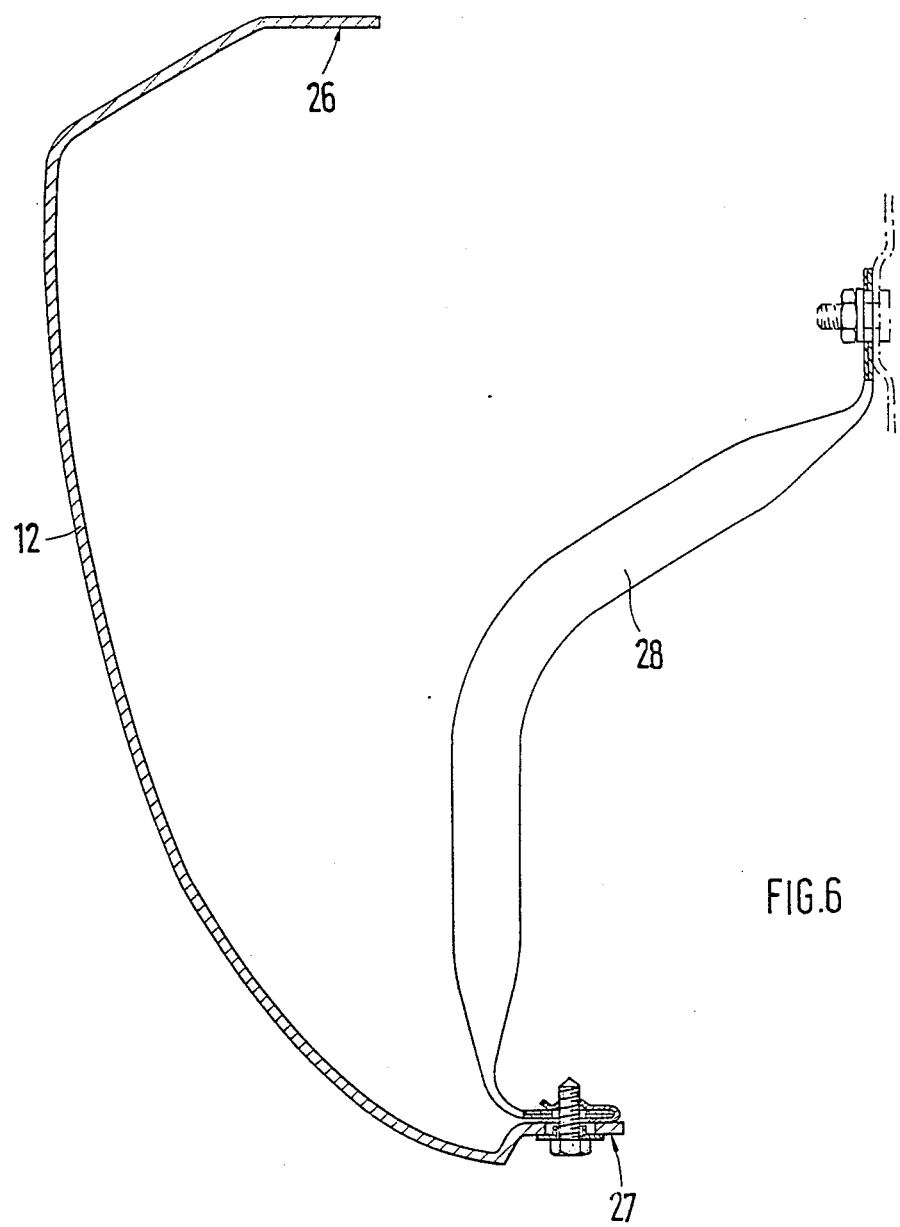
FIG. 6 is a sectional view taken along the Line VI—VI of FIG. 4.

A holding element 15 that is arranged below the dimensionally stable support 8 is formed by an angular supporting element 19. One end area 20 of the supporting element 19 is connected with a vertically projecting web 21 of the support 8, and the other end section 22 is connected with a horizonally aligned flange 23 of the central part 11 via detachable fastening elements 24 (FIG. 5).

Figure 9:
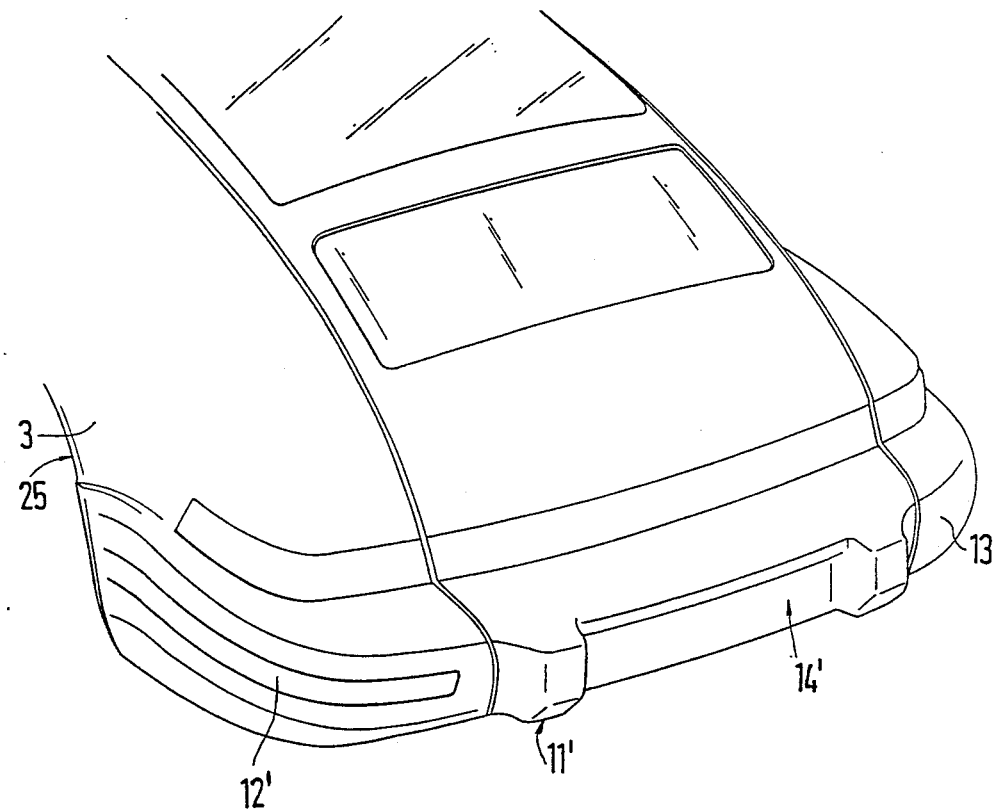
FIG. 9 is a view corresponding to FIG. 1 showing another embodiment of the invention with a different central and side part.

The central part 11, 11' of the covering 9 has approximately the width of the tail gate 4 arranged above it (FIG. 1 and 9).

The two side parts 12, 13 extend around the body 2 in a curved shape and reach to the adjacent wheel openings 25. The central part 11—in transverse direction of the vehicle—is connected in a form-fitting way with the two side parts 12, 13. However, in longitudinal direction of the vehicle, the central part 11 can be moved relative to the side parts 12, 13. In the drawings and the following description, the connection of side part 12 with central part 11, 11' is shown and described, it is to be understood that a corresponding similar connection is provided between the central part 11, 11' and the side part 13.

Figure 7:
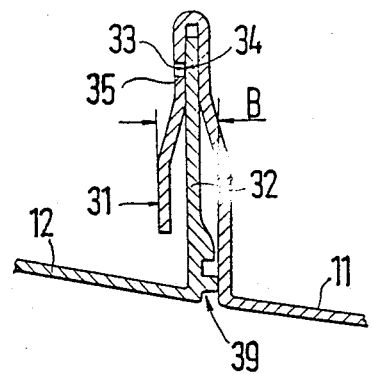
FIG. 7 is a sectional view taken along the Line VII—VII of FIG. 3.
Figure 8:
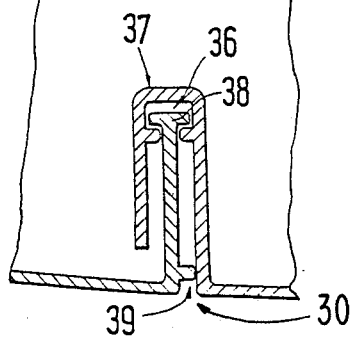
FIG. 8 is a sectional view taken along the Line VIII—VIII of FIG. 4.

The two side parts 12, 13 are connected firmly with the body 2. An upper edge area 26 of the side parts 12, 13 is held in poistion at the adjacent body 2 by means of screwable fastening elements that are not shown in detail. For the fastening of a lower edge area 27 of the side parts 12, 13, holders are provided at 28 and 29 that are fastened at the body 2. The two side parts 12, 13 of the coverings overlap the central part 11 in transverse direction of the vehicle by a small amount (quantity B). According to FIG. 7, in an upright connecting area 30, between the central part 11 and the side parts 12, 13, U-shaped receiving sections 31 are molded onto the central part 11, projecting webs 32 of the adjacent side parts 12, 13 engaging into side receiving sections 31. Between the side parts 12, 13 and the central part 11, a snap connection 33 is provided in the upright connection area 30. This snap connection 33 comprises a cylindrical cam 34 that is molded onto the web 32, said cam 34 projecting into an opening 35 of the receiving section 31.

So that in the case of an impact in the center, the central part 11 carries out a defined movement and subsequently returns to its initial position, the central part 11, via horizontally aligned guiding devices 36 extending in longitudinal direction of the vehicle, interacts with the side parts 12, 13. The guiding devices 36 are provided above and below the dimensionally stable support 8. Each guiding device 36 comprises a guiding rail 37 that is developed at the central part 11, a holding section 38 of the side part 12, 13 engaging into said guiding rail 37. The guiding rails 37 extend as an extension of the receiving section 31 and in their cross-section are profiled to be approximately U-shaped. The holding section 38, at the end face, is molded onto the web 32 of the side parts 12, 13 and is profiled to be T-shaped or L-shaped. During a collision against the central part 11, the snap connection 33 would be released when sufficient force is applied to accommodate the longitudinal movement with respect to the side parts 12, 13.

A joint 39 between the central part 11 and the side parts 12, 13, that extends in the upright and partially in the upper area of the covering 9, is in alignment with the joint 40 extending between the tail gate 4 and the body 2.

Figure 11:
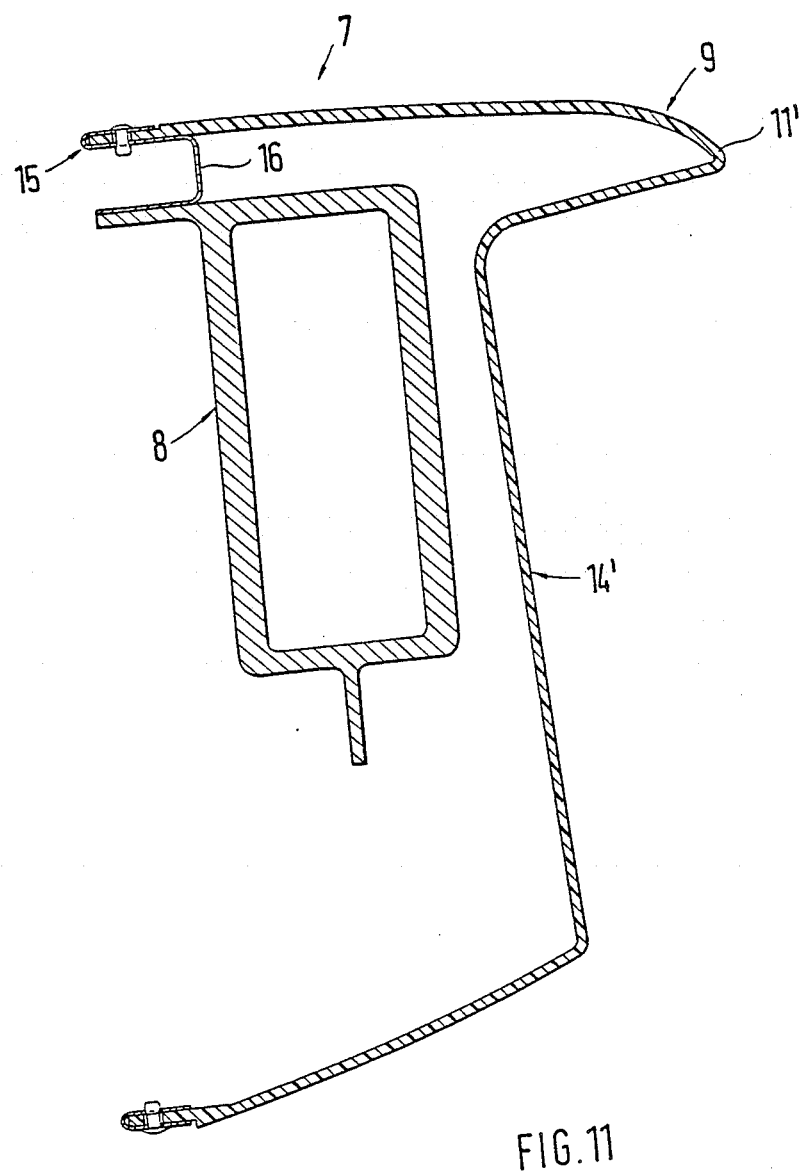
FIG. 11 is a sectional view corresponding to FIG. 10 showing another embodiment of a central part.

In order to meet the specific requirements of the different countries, the central parts 11, 11' can be inserted into the covering 9 with identical connection measurements but differently developed recesses 14, 14', whereas the same side parts 12, 13 can be used for all countries. The central part 11 shown in FIG. 10 has a recess 14 that has a lower height and a larger width than recess 14' of the central part 11' according to FIG. 11. The two central parts 11, 11' also differ from one another with respect to their shaping. The connecting areas to the holding elements 15 and to the adjacent side parts 12, 13, however, are developed to be identical. Above the recess 14 of the central part 11, the support has a reinforcing element 41 that is firmly connected with the support and is surrounded by the central part 11. However, side parts 12, 13 can also be inserted into the covering 9 that have identical connecting measurements, but a different shaping or different dimensions as shown at 12' in FIG. 9.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A bumper arrangement for a passenger motor vehicle or the like of the type having a vehicle body having a dimensionally stable bumper support means, comprising
    an at least three part elastic covering means for covering the bumper support, said at least three part elastic covering means being formed of a central and two adjacent and separate side covering part means extending adjacent one another in a transverse direction of the vehicle, the central covering part means being held in position on the vehicle solely by said dimensional stable bumper support means and the side covering part means being firmly attached to the vehicle body, and
    ends of said side covering part means having projection means engaging into receiving means of said central covering part means for releasably connecting the at least three covering part means to one another in such a manner as to permit selective replacement of said at least three covering part means.

2. An arrangement according to claim 1, wherein said central covering part means includes a central license plate accommodating recess means.

3. An arrangement according to claim 2, wherein said receiving means of said central covering part means is located at lateral ends of the central covering part means.

4. An arrangement according to claim 3, wherein said central covering part means has a transverse width corresponding substantially to the transverse width of a tailgate of the vehicle.

5. An arrangement according to claim 2, wherein the central covering part means can be replaced with a differently configured central part means having a differently developed recesses for the license plate while retaining the side covering part means.

6. An arrangement according to claim 1, wherein said side covering part means can be replaced with differently shaped side covering part means while retaining the central part.

7. An arrangement according to claim 1, wherein the central covering part means is held in position by said dimensionally stable support means by holding element means.

8. An arrangement according to claim 7, wherein said holding element means include a holding element for the central covering part means that is arranged above the dimensionally stable bumper support means and is formed by a rail extending in transverse direction of the vehicle, said rail supporting itself at said dimensionally stable bumper support means and receiving a free end of the central covering part means, the free end of the central covering part being connected with the rail by at least one of gluing and screwing.

9. An arrangement according to claim 7, wherein said holding element means includes a holding element arranged below the dimensionally stable support means which is formed by a supporting member that, via detachable fastening elements, is connected with a web of the dimensional stable bumper support means and a flange of the central covering part means.

10. An arrangement according to claim 1, wherein the bumper support is arranged adjacent to a vehicle tailgate, and wherein the central covering part means of the covering means has approximately the width of the tail gate.

11. An arrangement according to claim 1, wherein the two side covering part means overlap in part the central covering part means.

12. An arrangement according to claim 1, wherein the central covering part means is moveable relative to the side covering part means in longitudinal direction of the vehicle.

13. An arrangement according to claim 1, wherein the central covering part means is provided with additional receiving sections, into which projecting webs of the adjacent side covering part means engage.

14. An arrangement according to claim 13, wherein a snap connection is provided between the receiving means and the projecting means.

15. An arrangement according to claim 14, wherein the snap connection comprises a cam that is molded onto the projection means and wherein said cam projects into an opening of the receiving means.

16. An arrangement according to claim 1, wherein the central covering part means is also connected with the side covering part means via horizontally aligned guiding devices that extend in longitudinal direction of the vehicle.

17. An arrangement according to claim 16, wherein the guiding devices are provided at the central covering part means above and below the dimensionally stable bumped support means.

18. An arrangement according to claim 16, wherein each guiding device is formed by a guide rail arranged at the central covering part means and a holding section of the side covering part means and with the holding section engaging in the guide rail.

19. An arrangement according to claim 1, wherein a joint defined between an upright connection area of the covering between the central covering part means and the side covering part means is viewed as an extension of a joint extending between a tailgate and the vehicle body.

* * * * *